United States Patent
Brock et al.

(10) Patent No.: US 9,958,251 B1
(45) Date of Patent: May 1, 2018

(54) SINGLE SNAP-SHOT FRINGE PROJECTION SYSTEM

(71) Applicants: Neal Brock, Tucson, AZ (US); Goldie Goldstein, Tucson, AZ (US); Brad Kimbrough, Tucson, AZ (US); Erik Novak, Tucson, AZ (US); James Millerd, Tucson, AZ (US)

(72) Inventors: Neal Brock, Tucson, AZ (US); Goldie Goldstein, Tucson, AZ (US); Brad Kimbrough, Tucson, AZ (US); Erik Novak, Tucson, AZ (US); James Millerd, Tucson, AZ (US)

(73) Assignee: AD TECHNOLOGY CORPORATION, Tucson, AZ (US)

( * ) Notice: Subject to any disclaimer, the term of this patent is extended or adjusted under 35 U.S.C. 154(b) by 1 day.

(21) Appl. No.: 15/227,837

(22) Filed: Aug. 3, 2016

Related U.S. Application Data

(60) Provisional application No. 62/201,401, filed on Aug. 5, 2015.

(51) Int. Cl.
  *G01B 9/02* (2006.01)
  *G01B 11/24* (2006.01)

(52) U.S. Cl.
  CPC ........ *G01B 9/0201* (2013.01); *G01B 11/2441* (2013.01); *G01B 2290/70* (2013.01)

(58) Field of Classification Search
  CPC .............. G01B 9/0201; G01B 9/02081; G01B 11/2441; G01B 2290/70; G01B 2290/45; G01J 2009/0265

(Continued)

(56) References Cited

U.S. PATENT DOCUMENTS 5,973,784 A * 10/1999 Szwaykowski .... G01B 11/2441
                                                    356/495
6,304,330 B1   10/2001 Millerd et al.
(Continued)

OTHER PUBLICATIONS

Sai Sila Gorthi et al., "Fringe Projection Techniques: Whither we are?," Optics and Lasers in Engineering, Sep. 2009.

(Continued)

*Primary Examiner* — Tarifur Chowdhury
*Assistant Examiner* — Jonathon Cook
(74) *Attorney, Agent, or Firm* — Antonio R. Durando

(57) ABSTRACT

A cycloidal diffraction waveplate is combined with a pixelated phase mask (PPM) sensor in a dynamic fringe-projection interferometer to obtain phase-shifted interferograms in a single snap-shot camera operation that provides the phase information required to measure test surfaces with micrometer precision. Such mode of operation enables a portable embodiment for use in environments subject to vibration. A shifting mechanism coupled to the cycloidal waveplate allows temporal out-of-phase measurements used to remove noise due to test-surface characteristics. Two or more pixels of each unit cell of the PPM are combined to create super-pixels where the sum of the phases of the pixels is a multiple of 180 degrees, so that fringes are eliminated to facilitate operator focusing. By assigning colors or cross-hatch patterns to different ranges of modulation measured at the detector, the areas of best focus within the field of view are identified quantitatively to ensure measurements under best-focus conditions.

19 Claims, 6 Drawing Sheets

(58) Field of Classification Search
USPC .......................................................... 356/495
See application file for complete search history.

(56) References Cited

U.S. PATENT DOCUMENTS

| | | |
|---|---|---|
| 7,057,738 B2 | 4/2006 | Millerd et al. |
| 7,057,737 B2 | 6/2006 | Millerd et al. |
| 7,170,611 B2 | 1/2007 | Millerd et al. |
| 7,230,717 B2 | 6/2007 | Brock et al. |
| 7,298,497 B2 | 11/2007 | Millerd et al. |
| 7,777,895 B2 | 8/2010 | Medower et al. |
| 2005/0007603 A1* | 1/2005 | Arieli ................. G01J 9/02 356/601 |
| 2005/0046865 A1* | 3/2005 | Brock ............... G01B 9/02057 356/495 |

OTHER PUBLICATIONS

Nelson V. Tabiryan et al., "The Promise of Diffractive Waveplates," Optics and Photonic News, Mar. 2010.

S.R. Nersisyam et al., "The Principles of laser beam control with polarization gratings introduced as diffractive waveplates," SPIE Proceedings, vol. 7775, Sep. 2010.

S.R. Nersisyan et al., "Optical Axis Gratings in Liquid Crystals and their Use for Polarization Insensitive Optical Switching," J. of Nonlinear Optical Physiscs & Materials, Mar. 2009.

Stacy Wise et al., "On the phase of light diffracted by gratings," Jan. 2005.

\* cited by examiner

SINGLE SNAP-SHOT FRINGE PROJECTION SYSTEM

RELATED APPLICATIONS

This application is based on and claims the priority of U.S. Provisional Application Ser. No. 62/201,401, filed on Aug. 5, 2015, hereby incorporated by reference in its entirety.

GOVERNMENT LICENSE RIGHTS

This invention was made with government support under Grant No. 1556049 awarded by the National Science Foundation. The government has certain rights in the invention.

BACKGROUND OF THE INVENTION

Field of the Invention

The invention relates generally to surface metrology. More particularly, the invention relates to fringe-projection methods and apparatus implemented with both single-frame and multi-frame measurement capability.

Description of the Related Art

Fringe-projection systems have been used for surface topography for nearly 50 years. A structured pattern (usually a sinusoidal fringe pattern, such as produced by a defocused Ronchi grating) is projected onto a test object and the resulting image of the object is captured. Most fringe-projection techniques require several images of the object to be captured with variations in the projected fringe pattern. (Some methods use a single frame with carrier frequency fringes, but they are very limited in object range measurement.) One of the most common methods involves moving the grating laterally and capturing multiple corresponding frames of data that are then processed with one of several well-known fringe-analysis techniques to generate a surface map of the test object. Another method involves using spatial light modulators, like digital micro-mirror devices (DMDs), liquid-crystal diodes (LCDs), liquid-crystal on silicon devices (LCoSs), and organic light-emitting diodes (OLEDs), to produce different fringe patterns for each of a number of successive camera frames, which are again analyzed using one of the well-known fringe analysis techniques. Yet other methods involve using multiple light sources, either of different colors or used at different angles, to produce multiple images that can then be combined to provide more complete information about the 3-D shape of an object.

These conventional approaches have the disadvantage that they are sensitive to vibration and/or motion of the part or test system; that is, the system-to-part distance must not change within the time of acquisition of the multiple frames required for analysis. Therefore, these systems are typically not used outside environments that are vibration-isolated and they are practically impossible to implement in handheld instruments, such as required for in-situ surface metrology of large precision-machined components. They are equally unsuited for on-machine metrology such as is needed in the newly evolving field of additive manufacturing (also called stereolithography), for example, where the surface being produced can be improved via continuous monitoring of the manufacturing process. High-precision metrology systems such as 3-D microscopes, industrial styli, and atomic force microscopes can achieve nm-level resolutions across a wide variety of surfaces, but are slow for measuring large areas and are not portable; thus, they are incompatible with shop-floor operation. Coordinate measuring machines (CCMs), laser trackers, and 3-D stereoscopes can measure large components in situ and rapidly, but they cannot achieve micrometer-level lateral and vertical resolutions. Therefore, they are also not suitable for measuring many manufactured parts, such as turbine blades, drive shafts, transmissions and solar panels, all of which require in-situ metrology with high resolution for accurate characterization during manufacture and for subsequent maintenance operations.

Moreover, manufacturing tolerances in major industries are becoming more stringent in order to meet specifications required for lifetime durability, appearance, and environmental factors. Minor surface imperfections on edges or in other critical surface areas can have a dramatic effect on performance or cause the failure of machined components, particularly in high-stress environments. During maintenance inspections, wear scars or corrosion pits that can progressively worsen and lead to catastrophic failures must be identified and quantified precisely to ensure that only necessary repairs and replacements are performed. For example, it is estimated that currently the prevention of corrosion-related failures accounts for nearly $700 million in losses each year due to unnecessary part-replacement cost in the turbine industry alone. Therefore, any measurement tool that allowed a more precise quantification of imperfections as they relate to failures would be invaluable in the industry. Similarly, additive manufacturing now allows parts of very complex geometries to be formed with features as little as 5 µm in width combined with conventional manufacturing practices to produce precision parts with both micrometer-smooth surfaces and complex geometries. Such components need accurate characterization to ensure they meet the performance and lifetime needs of precision manufacturers.

It is just not possible to measure many of these components with traditional metrology methods because they are too large to handle and cannot be moved to a laboratory-based measurement facility without destructively sectioning them or subjecting them to a time-consuming and difficult process of measurement by replication (i.e., repeatedly making a small negative of the area of interest on a test piece that is then measured separately), as is often done with powertrains, turbines and displays, for example. Handheld stylus systems, having neither the ability to measure near edges due to the fragility of the measurement styli nor the ability to support applicable ISO surface standards (because they can only quantify 2-D information for pattern inspection or discrete defect area, for instance, but not 3-D topographic information), are limited in the scope of their application. Moreover, current in-line methods are machine-vision-based with limited lateral resolution (in the order of ~100 um). Three-dimensional laser scanners and stereoscopes, while excellent at performing geometric checks of components, cannot achieve better than about 15 µm of lateral resolution and hundreds of microns of vertical resolution; thus, they can neither check roughness nor shape of small features to the level required for quality control and maintenance of many precision parts. CMMs can achieve high form resolution but do not have adequate sampling density for defect or small-feature quantification.

Optical techniques such as 3-D microscopes are increasingly being used for precision shape and roughness metrology. However, these microscope-based systems are also neither portable nor amenable to shop-floor environments, as they require air isolation to mitigate vibration in order to achieve sub-micron precision. Similarly, interferometric inspection tools measure small areas and are limited to laboratory-bench use because they also require vibration isolation. Due to these restrictions, the measurements are performed after the manufacturing process is complete, precluding the ability to perform real-time form and roughness metrology and closed-loop process control. Therefore, neither of these techniques is suitable for many industrial settings or for in-situ metrology of large parts. What is needed is a new approach that enables high-resolution, flexibly deployed shop-floor 3-D metrology with real-time measurement and analysis of surface topography. The present invention provides a solution to such need for controlling advanced manufacturing processes with the resolution and throughput necessary to classify micro-defects at full production rates.

SUMMARY OF THE INVENTION

The idea of the invention is to combine an orthogonal polarizer with a dynamic imaging system, as both optical structures are herein defined, in a fringe-projection interferometric set-up to obtain spatially separated phase-shifted interferograms in an operation that with a single snap-shot of the detector(s) provides all the information required to reconstruct the 3-D shape of a test surface with micrometer precision. As a result of its single-snap-shot mode of operation, the invention is suitable for implementation for use in environments subject to vibration and other environmental conditions inappropriate for temporal phase-shifting interferometry, including hand-held operation or mounting within the machining center of an additive manufacturing machine.

In a particular embodiment of the invention, it is envisioned that a shifting mechanism can be added to the instrument in order to shift the phase of the fringe pattern and also perform temporal measurements. While this mode of operation negates the vibration-immune nature of the instrument, when in a stable enough environment the shifting mechanism can be used to reduce noise due to test-surface variations in brightness, or due to translucent materials that may confuse the nominal measurement signal. In particular, two such frames, temporally phase-shifted by $\pi$ radians so as to wash out fringes, can be combined and then used to normalize the image obtained by the camera on a pixel-by-pixel basis to correct for test-surface non-uniformities.

According to another aspect of the invention, two or more pixels of each unit cell of a pixelated phase mask are combined to create a super-pixel where the sum of the phases of the pixels is a multiple of 180 degrees (180, 360, etc.), so that the interference fringes are eliminated when an image is displayed using such super-pixels. Under such conditions, the image seen by an operator is essentially the bright-field image of the test surface without the confusing presence of interference fringes, so that best focus can more easily found visually by an operator, just like the operator would do when using a conventional bright-field microscope or other viewing device. Furthermore, by assigning colors to different ranges of modulation measured at the detector, the areas of best focus within the field of view can be identified quantitatively. The operator may use that information to optimize the measurement signal over the field of view, or, if that is not possible, the information can be used to calculate surface heights only for such areas that are in focus.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose only a few of the various ways in which the invention may be practiced.

DETAILED DESCRIPTION OF THE INVENTION

Figure 1:
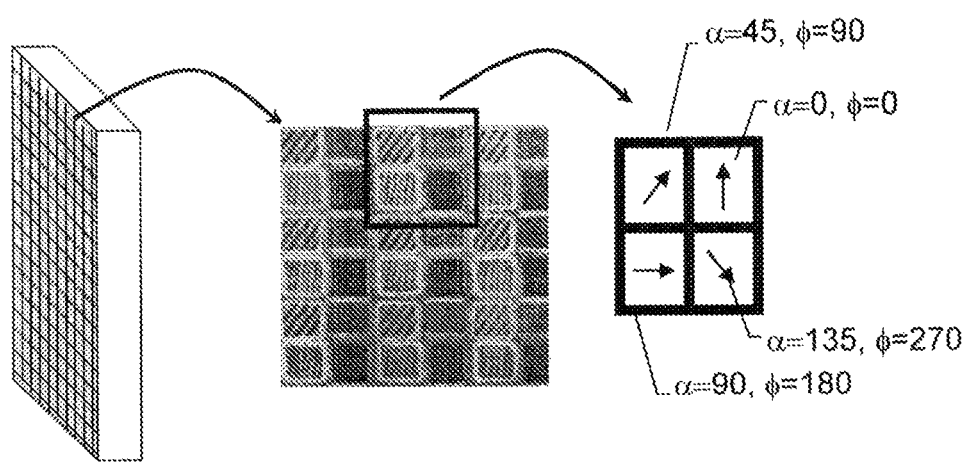
FIG. 1 shows a pixelated phase mask (PPM) sensor according to the invention comprising an array of wire grid micro-polarizers on a glass substrate bonded to a detector array. The phase mask produces four different polarizations through each unit cell of 2×2 different phase shifts.

For the purposes of this specification of the invention, as described and claimed, the term "orthogonal polarizer" is used to describe any optical device that produces an output of two orthogonally polarized beams. Such beams are preferably, but not necessarily, achromatic. For instance, without limitation, cycloidal diffractive waveplates, birefringent prism pairs such as Wollaston, or interferometers like Twyman-Green with a polarizing beam-splitter, are hereby defined as orthogonal polarizers when configured to produce such output. The terms "dynamic interferometry" and "dynamic interferometer" are defined and used to include any interferometric method and corresponding apparatus where at least three phase-shifted interferograms can be produced simultaneously from two orthogonally polarized beams. As such, all embodiments of the fringe-projection systems of the invention described below are referred to as dynamic fringe-projection interferometers. In that context, the term "dynamic imaging system" is used herein to refer to the back end of a dynamic fringe-projection interferometer where suitable optical elements are used to image said at least three phase-shifted interferograms either on multiple cameras or on a single camera with different sets of pixels configured to detect respective interferograms. For example, the use of a pixelated phase sensor, as described below, is ideal for implementing a dynamic imaging system according to the invention. The term "phase-shifting mechanism" is used to refer to any device used in the illumination path to produce a temporal phase shift in the fringes resulting from the orthogonal polarizer used for the invention; without limitation, such a device could be mechanical, such as a linear or rotational actuator, or electronic, such as a liquid crystal or a solid-state switchable polarizer or retarder, or a rotating polarizer or retarder. As those skilled in the art will readily understand, the terms "fringes," "fringe pattern" and "interferogram" are used interchangeably in this description of the invention as referring to the wavefront produced by interfering light beams. Those skilled in the art understand that the term "single-frame" applies in particular to single-detector image acquisition and "single snap-shot" applies to simultaneous multiple-detector image acquisition. However, for convenience and simplicity of description, the terms "single-frame" and "single snap-shot" are also used interchangeably herein to refer generally to simultaneous data acquisition as applicable to the particular dynamic imaging system at hand, whether with a single detector or multiple detectors. Finally, as normally done in the art, it is understood that the term "detector" is used generically to refer to, and is intended to encompass, any device capable of sensing and quantitatively measuring an optical signal impinging on it, such as cameras and charge-coupled devices (CCDs).

Based on the above definitions, the invention is based on the recognition that a portable single snap-shot fringe-projection tool can be obtained by combining the output of an orthogonal polarizer, preferably a cycloidal diffraction waveplate, with a dynamic imaging system in an instrument that produces the interference of orthogonally polarized beams projected onto the test object and simultaneously records the phase-shifted fringe images produced by the dynamic imaging system. Because such an instrument acquires in a single snap shot of the detector(s) all phase information required for phase-shifting analysis, it is vibration insensitive and can be hand operated in a portable configuration or mounted for in-situ measurement in a machining center.

As detailed in co-owned U.S. Pat. No. 7,230,717, a pixelated phase mask is subdivided into a plurality of sets of phase-mask pixels, such that each set produces a predetermined phase shift between orthogonally polarized test and reference beams. Thus, each set of phase-mask pixels provides a spatially separated fringe pattern (interferogram) on corresponding pixels of the detector. By providing at least three such sets of phase-mask pixels, each associated with a different phase shift, sufficient interferograms are produced to characterize a sample surface using conventional interferometric algorithms. For best results, the phase-mask pixels are preferably distributed uniformly throughout the phase-mask in unit cells so that each pixel in a cell is surrounded by adjacent pixels belonging to other sets. Similarly, for best resolution, a one-to-one correspondence is preferably used between the phase-mask and the detector pixels.

Various parameters of test objects may thus be measured by simultaneously generating multiple spatially phase-shifted interferograms on a single detector array. FIG. 1 illustrates how the pixels of a pixelated phase mask are preferably distributed and oriented. The PPM of the figure consists of an array of wire grid micro-polarizers on a glass substrate that is bonded to a detector array, thereby obtaining a pixelated phase sensor. The phase mask is comprised of four different polarizations in a unit cell of 2×2 different phase shifts, as noted in the figure. When two impinging interfering beams with, for example, orthogonal circular polarizations (i.e., right-hand circular and left-hand circular) are combined, the measured intensity at each pixel of the mask is given by the equation $$I(x, y) = \frac{1}{2}(I_r + I_s + 2\sqrt{I_r I_s} \cos(\Delta\phi(x, y) + 2\alpha_p)) \quad (1)$$

where $\alpha_p$ is the angle of the polarizer with respect to the x, y plane, $I_r$ and $I_s$ are the intensities of the two beams r and s, respectively, and $\Delta\varphi(x, y)$ is the optical path difference between the beams. A polarizer oriented at zero degrees causes interference between the in-phase (i.e., 0°) components of the interfering beams, whereas polarizers oriented at 45°, 90° and 135° result in phase shifts of 90° ($\pi/2$), 180° ($\pi$), and 270° ($3\pi/2$).

Thus, four separate interferograms for each of the phase shifts can be synthesized by combining pixels with like phase shifts and the resulting interferograms can be observed in real-time. More importantly, the resulting interferograms can be processed by a variety of algorithms that are well known in the art for calculating phase data. For example, a possible implementation for measuring phase difference is the simple four-bucket algorithm $$\phi(x, y) = \arctan\left(\frac{I_4(x, y) - I_2(x, y)}{I_1(x, y) - I_3(x, y)}\right) \quad (2)$$

where the values $I_1$, $I_2$, $I_3$, and $I_4$ are the intensity values taken from adjacent neighboring pixels. This calculation can be done in real time to produce dynamic phase images.

Figure 2:
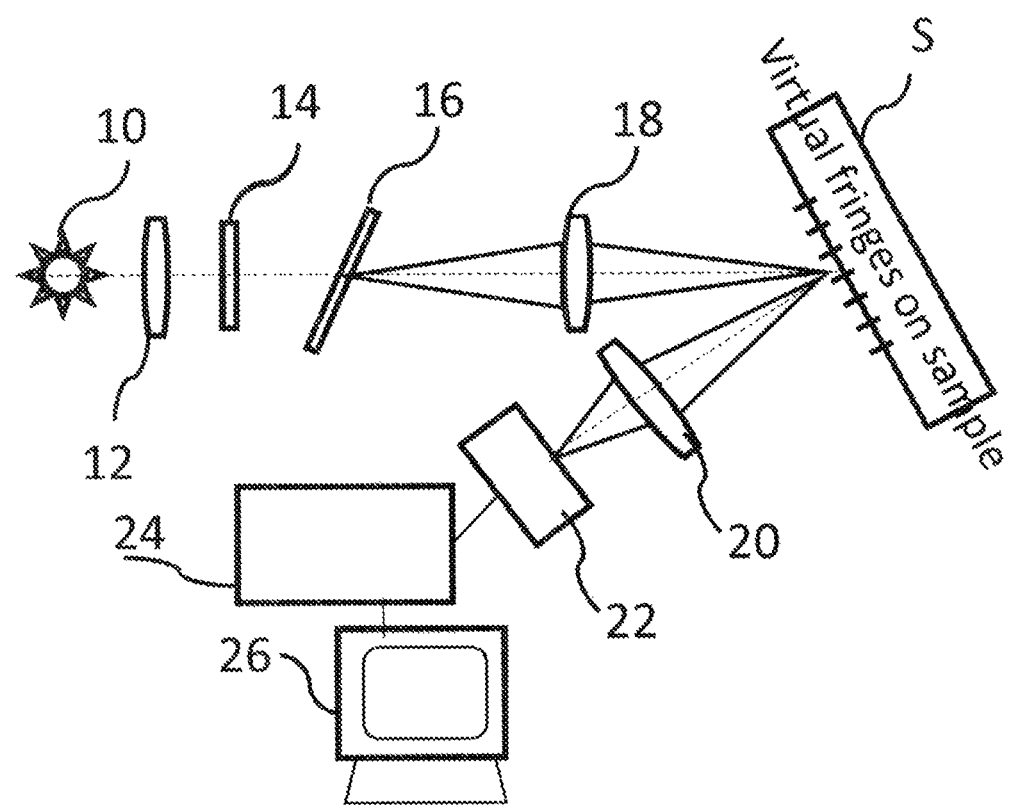
FIG. 2 is a schematic representation of a dynamic fringe-projection interferometric system wherein a cycloidal diffraction waveplate (CDW) is combined with a pixelated-phase-mask sensor according to the invention.

According to the preferred embodiment of the invention, a pixelated phase sensor such as described above constitutes the dynamic imaging system that is combined with an orthogonal polarizer (preferably a cycloidal diffractive waveplate) in a fringe-projection system to produce virtual sinusoidal interference fringes onto the sample and then to detect the virtual fringes formed on the sample and process them conventionally for interferometric analysis, as illustrated in FIG. 2. In essence, projecting the image of a sinusoidal grating is analogous to creating fringes via interference of test and reference beams, except that the two interfering beams are orthogonally polarized beams generated from a single beam that produce virtual fringes captured by the dynamic imaging system. The period of the projected fringe pattern becomes a function of the angle between the two beams when created via two-beam interference. If the two beams creating the interference pattern are orthogonal in polarization states, such as produced by a diffractive cycloidal waveplate, virtual fringes are projected onto the sample that can be imaged using the pixelated-mask sensor, thereby producing the image of the sample with four phase-shifted fringe patterns.

Cycloidal diffractive waveplates and, more generally, polarization gratings can be produced (as taught in U.S. Publication No. 20140092373 and U.S. Pat. No. 7,692,759, respectively, for example) such that they create two orthogonal circularly polarized beams with a specified angular separation. When linearly polarized light from a source (such as, for example, an LED, a conventional bulb, a filtered conventional bulb, or a laser diode) illuminates an orthogonal polarizer, such as a cycloidal diffractive waveplate, that emits two orthogonal circularly polarized beams that are then projected and combined onto a sample in a fringe projection system, the achromatic nature of the orthogonal polarizer creates high-quality fringes across the field of view despite the spectral properties of the source (within the allowable spectral bandwidth of the orthogonal polarizer). Since the two orthogonal beams exiting the orthogonal polarizer are circularly polarized, no other polarization elements are necessary in the system in order to simultaneously acquire four phase-shifted images on the pixelated camera.

It is noted that the interference fringes produced by the system of the invention are not the product of the traditional combination of wavefronts reflected from a test and a reference surface, but are rather produced independently of the surface under test and projected onto the work-piece to be measured. However, the phase calculated from such measurements is still subject to the $2\pi$ discontinuities of conventional phase measurement techniques. Accordingly, the data obtained from the fringe-projection system of the invention has to be "unwrapped" conventionally and scaled to obtain the topography of the test-object surface.

Referring back to FIG. 2, the preferred embodiment of the invention utilizes an LED source 10 emitting a light that is passed through collimating optics 12 and a linear polarizer 14, and then injected into a cycloidal diffractive waveplate 16 that produces two orthogonal circularly polarized beams with a slight angular separation, thereby producing virtual fringes that are then imaged through appropriate focusing optics 20 by a dynamic imaging system 22. (Note that in fringe projection the direction of projection and observation have to be different; otherwise, the system sensitivity is zero.) As explained above, the dynamic imaging system is preferably a pixelated phase sensor that combines a pixelated phase mask with a bonded detector array. A processor 24 and a monitor 26 are adapted to receive the irradiance information detected at each pixel of the detector array, perform interferometric analysis, and display corresponding images in conventional manner, as desired and programmed by the user of the system.

Figure 3:
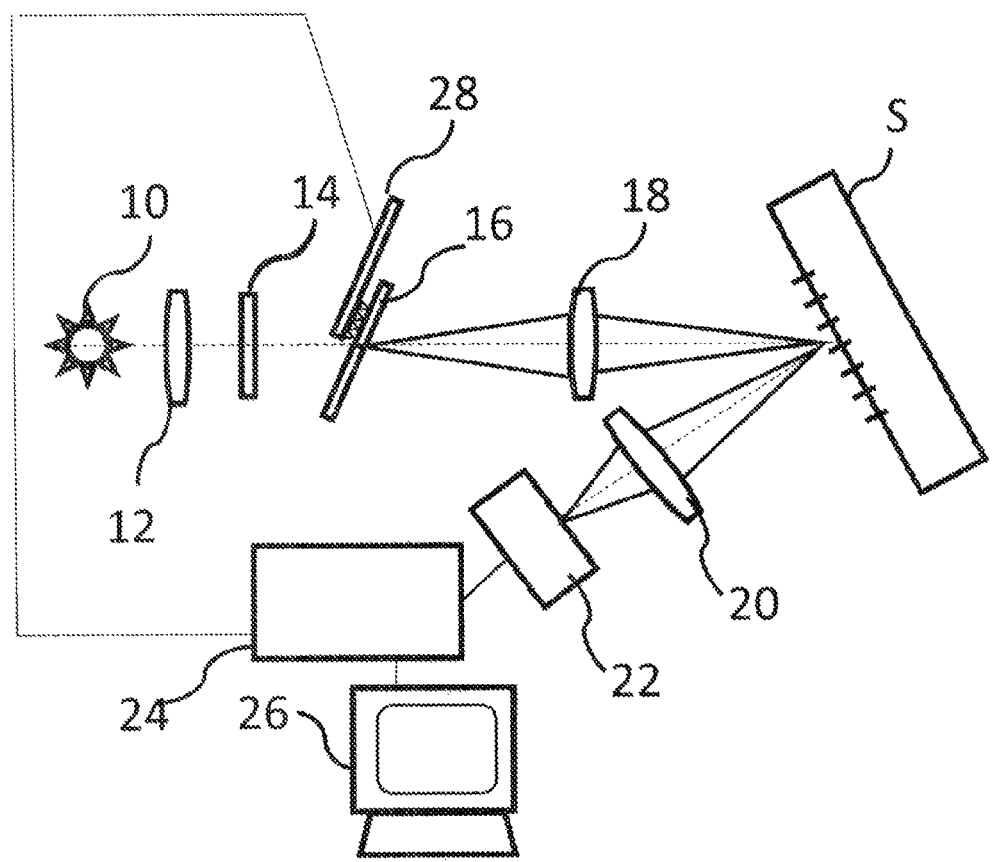
FIG. 3 is the fringe-projection system of FIG. 2 including a shifting mechanism to enable the temporal phase shifting of the fringes produced by cycloidal diffraction waveplate.

Thus, a vibration insensitive system has been described for measuring objects with a single-frame fringe-projection approach that makes it possible to test parts in situ with a portable instrument with a precision in the order of 2 µm. However, the system may be used as well with the same orthogonal-polarizer/dynamic-imaging-system combination in non-portable laboratory and shop-floor applications where additional frames can be used instead of the single-frame implementation to further reduce the noise floor of the instrument When a rough or high-lateral-contrast surface is tested with the single-frame fringe-projection method of the invention utilizing a dynamic imaging system such as the pixelated-phase-mask sensor of FIGS. 1 and 2, depending on the spatial characteristics of the sample, the sample roughness and/or contrast can cause increased levels of noise at the detector. This part-dependent noise problem of the single-frame approach of the invention can be reduced materially by acquiring three or more temporally phase-shifted frames. This is achieved in conventional manner by shifting the orthogonal polarizer laterally or by the angular rotation of the incident polarization, as applicable for the particular optical element used, so as to provide adequate phase shifts for sample phase retrieval. To that end, a phase-shifting mechanism 28 capable of providing precise lateral or rotational motion, as applicable to the particular orthogonal polarizer being used, is coupled to the orthogonal polarizer 16, as illustrated schematically in FIG. 3. (Note that a liquid crystal phase shifter, or a rotating polarizer, or a solid-state switchable polarizer could be used as well and are intended to be represented by element 28 in FIG. 3.) Because this implementation would require temporal shifts with the attendant problems of vibration errors, it is particularly suitable for stationary shop-floor or laboratory applications. However, it is anticipated that it can also be implemented in a portable unit for in-situ applications by providing an anchoring mechanism for rigidly attaching the unit to the part being measured or by using a camera with a very fast acquisition rate so that several frames may be acquired before vibration becomes a factor.

Figure 4:
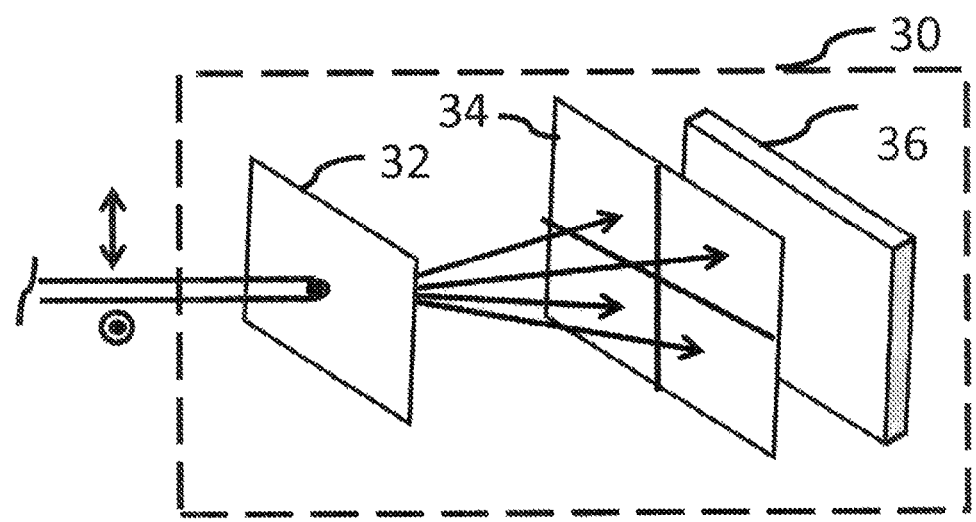
FIG. 4 illustrates an alternative configuration of a dynamic imaging system in the form of a holographic grating splitting an image into four spatially separated phase-shifted images acquired on a detector.

Alternative embodiments of the invention utilize other dynamic imaging system configurations. For example, as illustrated in FIG. 4, one such set-up 30 is described in U.S. Pat. No. 6,304,330. The combined orthogonally polarized beams produced by the orthogonal polarizer (shown as linearly polarized as an alternative output of an orthogonal polarizer suitable for the invention) are passed through a wavefront splitting element 32 that splits the combined wavefront into four sub-wavefronts, each of which follows a spatially discrete path to a respective quadrant of a phase-shifting interference element 34. As would be clear to those skilled in the art, the number of discrete sections in the phase-shifting interference element 34 is illustrated in quadrants, but it could be any number that (preferably) equals the number of sub-wavefronts provided by the wavefront-splitting element 32. The phase-shifting interference element 34 is disposed with respect to the wavefront-splitting element 32 so that each of the plurality of sub-wavefronts is respectively incident on the plurality of discrete sections in element 34; that is, each section receives one of the sub-wavefronts and shifts the relative phase between the orthogonally polarized wavefronts incident thereon by a discrete phase shift and interferes them to produce spatially phase-shifted interferograms. As in the case of a pixelated phase mask, the phase of each phase-shifted interferogram is out of phase with the phase of the other phase-shifted interferograms by a predetermined amount considered optimal for the inteferometric measurement at hand (typically shifts of 90°, 180°, and 270°).

Figure 5:
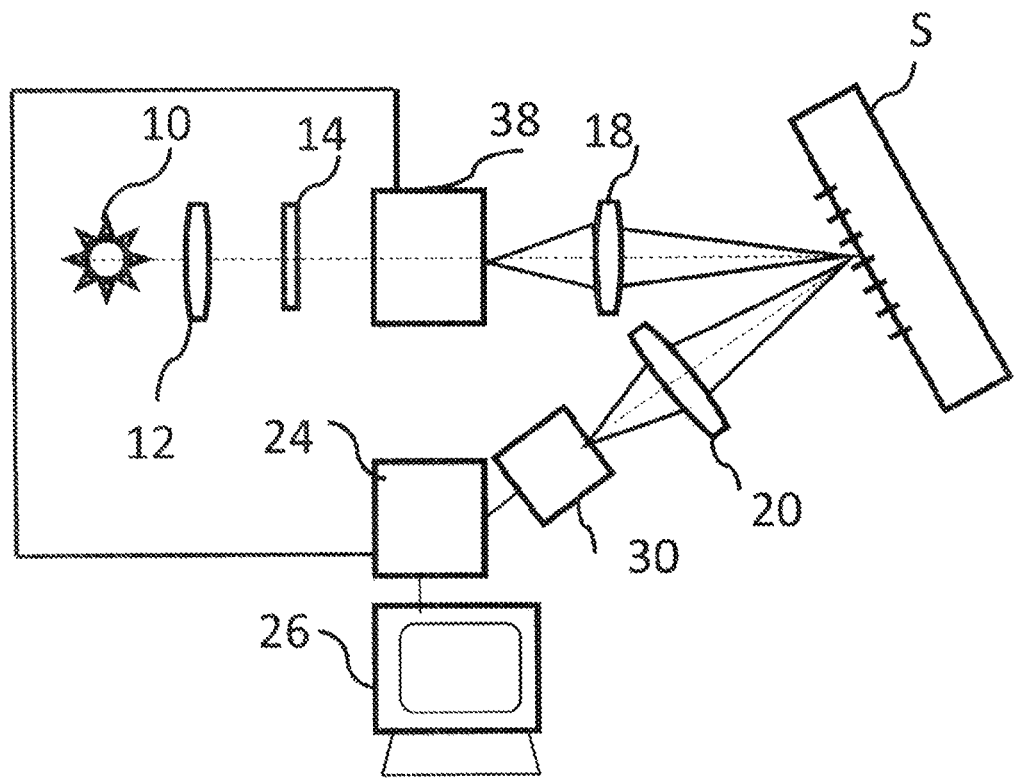
FIG. 5 shows schematically the combination of a generic orthogonal polarizer with a generic dynamic imaging system, as these are defined below, to illustrate broadly the dynamic fringe-projection interferometer of the invention.

Still with reference to FIG. 4, a light detector 36, such as an imaging sensor or a detector array, is disposed with respect to the phase-shifting interference element 34 so that the plurality of phase-shifted interferograms are substantially simultaneously incident on the active surface of the light detector 36, thereby imaging a respective plurality of phase-shifted interferograms. Based on the imaged interferograms, the spatially resolved phase of each of the phase-shifted interferograms can be measured instantaneously. The light detector 36 may be a single unit receiving all phase-shifted interferograms or comprise multiple detector components aligned with respective sections of the interference element 34. The active surface of the detector 36 (whether as a single or multiple-component detector) may be defined by a pixel array made from a plurality of individual detector arrays configured to function as a single active sensing element. For example, the active surface of each detector component may be defined by more than one CCD collectively functioning as a single array. FIG. 5 illustrates schematically the dynamic interferometer 30 of FIG. 4 combined with a generic orthogonal polarizer 38 (intended to comprise any orthogonal polarizer coupled, if necessary, to a suitable temporal phase-shifting mechanism) according to the invention.

Figure 6:
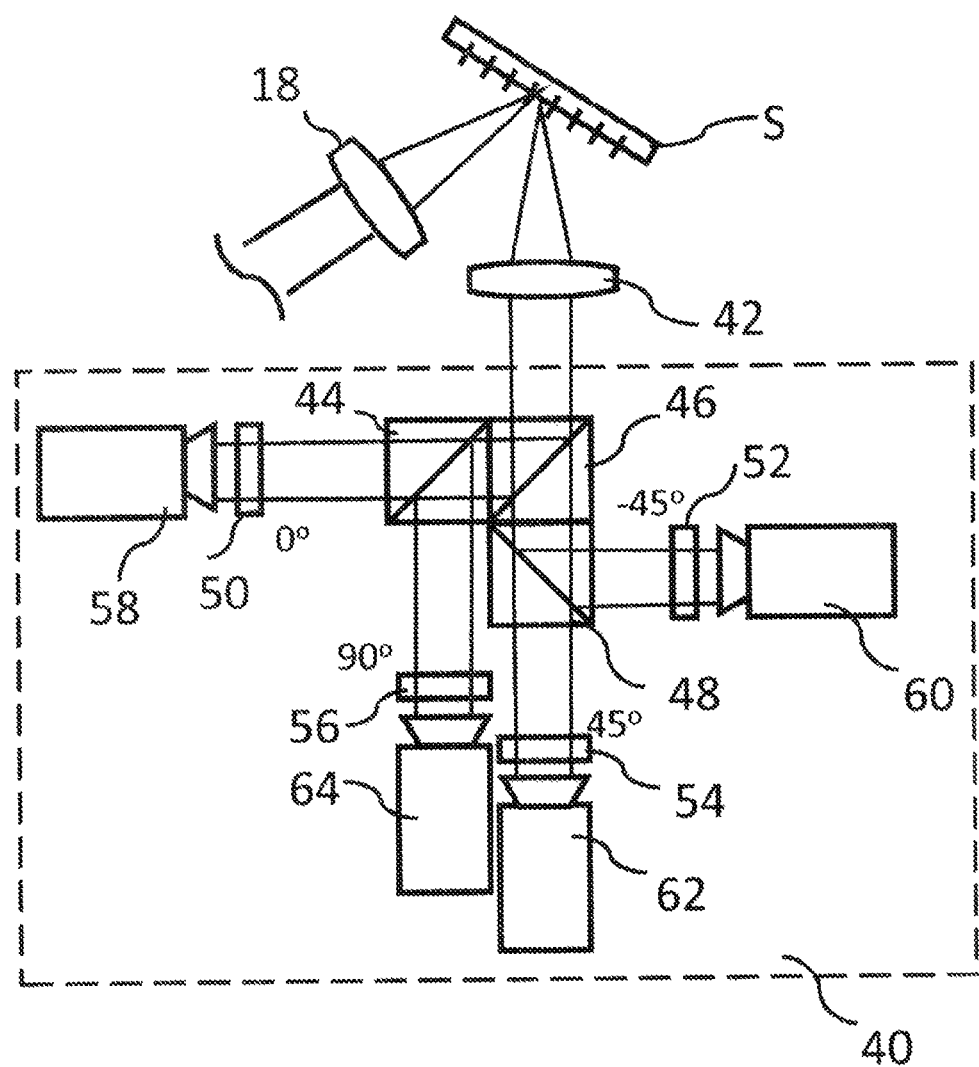
FIG. 6 illustrates schematically an alternative dynamic imaging system for the invention wherein split phase-shifted images are detected by four separate detectors.

FIG. 6 illustrates a dynamic imaging system 40 with multiple detectors, While not preferred, the system 40 could also be used to practice the invention. The beam received from the sample S is collimated by appropriate optics 42 and injected into the imaging system that includes three beam splitters (44,46,48) that produce four spatially separated beams. Each beam is passed through a respective phase-shifting element (50, 52,54,56) to produce respective wavefronts that are phase-shifted by 0 degrees, −45 degrees, 45 degrees, and 90 degrees and then detected by corresponding cameras (58,60,62,64). The images captured by the cameras can then be processed to provide sample information according to the invention.

An alternative implementation is based on a two-frame temporal measurement where the phase is separated by π radians [or by (π+2n π) radians, where n is 0 or an integer number] so that the two measurements are destructively out of phase with one another). The two images produced under such conditions can be averaged to obtain an adjusted map that is roughly equivalent to an intensity measurement in the absence of projected fringes (because of the π-radian phase difference). Such adjusted map can then be subtracted from the spatially phase-shifted correlograms produced at either frame by the phase mask to remove the influence of noise due to intensity variations of the sample under test. The four phase-shifted images of the corrected measurements still contain the information required for extracting the phase of the measured sample.

An example of an appropriate approach to carry out such two-frame correction is based on a normalization procedure to obtain a gain value between 0 and 1 at each pixel that can then be used to adjust one of the two measurement frames on a pixel-by-pixel basis. Such gain can be calculated at each pixel by averaging two frames as follows:

$$\text{Gain}=[\tfrac{1}{2}(\text{Frame1}+\text{Frame2})]/\max[(\tfrac{1}{2}(\text{Frame1}+\text{Frame2})], \quad (3)$$

where max refers to the maximum value among all values in the frame. The normalized measurement can then be obtained by applying the gain, pixel by pixel, to either of the two frames. Note that any combination of frames that averages to eliminate fringes can be used in similar fashion.

Whether in-situ or in a stationary setting, interferometric measurements nowadays are normally carried out by an operator in front of a monitor that makes it possible to find focus prior to executing the measurement. One of the challenges with fringe-based measurement methods lies in making the systems easy to use with limited training for the typical shop-floor gage operator. When examining the camera image of the object under test, the user sees the fringes (bright and dark bands) that comprise the measurement signal superimposed on the actual part image. This can be confusing to many users who are not accustomed to seeing fringes, know their part is not actually striped, and are unsure how to manipulate those fringes by adjusting focus to achieve the highest quality signal and thus the highest quality measurement.

The use of a pixelated mask, as detailed with reference to the invention, also offers a unique and innovative way of creating a non-confusing, user-friendly interface that provides feedback on when the part is in best focus with the highest signal quality with respect to the measurement system, so that the best surface metrology can be obtained. With a pixelated camera employing polarizing elements, each camera pixel sees a different phase of the sinusoidal fringes that are used for the measurement, with each pixel having a known phase difference from its neighbors. If two or more pixels are combined to create a super-pixel where the sum of the phases of the pixels that make it up is 180 degrees or some multiple of 180 degrees (180, 360, etc), then the fringes will effectively "wash out" when an image is displayed using such super-pixels. For instance, referring to the mask shown in FIG. 1, the four pixels in a unit cell can be added and the sum of the phases is 540 degrees (i.e., three times 180). Thus, each unit cell can be used to generate a super-pixel of data that in the aggregate will not show any fringes, but only what is effectively the bright-field image of the surface (as if one were simply looking at it under normal illumination). Therefore, finding the best-focus position is simplified because the distraction and uncertainty provided by the fringes is eliminated. It is noted that, while all of the above is more easily implemented with a pixelated phase sensor, it can also be implemented using combined images from multiple cameras, or one camera with 4 quadrants, as illustrated above.

However, while it is useful to eliminate the fringes so that the system user does not have to work with them, one still needs to indicate to the user whether the instrument is properly oriented with respect to the part intended to be measured in three dimensions. Fortunately, the various pixels in each cell can be combined in conventional manner to calculate the visibility (or modulation) of the fringes across the sample. For example, referring to the pixels of the cell shown in FIG. 1 as number 1 (upper left), number 2 (upper right), number 3 (lower right) and number 4 (lower left), the modulation for the cell is given by $$2*(\text{sqrt}[(I4-I2)^2+(I1-I3)^2]/(I1+I2+I3+I4) \quad (4)$$

where I is the intensity (or camera bit count) of each pixel. For any given fringe-based system, there is typically some modulation threshold above which one considers the signal-to-noise ratio very high and one knows a good measurement is possible. Similarly, there are often ranges where it is marginal, in which case a good measurement may be achieved but is not guaranteed, and some signal level below which measurements are unlikely to succeed. Modulation is affected by the distance of the measuring instrument from the sample, by sample reflectivity, by the angular orientation of the sample with respect to the measurement instrument, and other factors.

According to another aspect of the invention, the modulation calculated for each unit cells of the pixellated mask is used as a color overlay on the bright-field image. Such color overlay produces super-pixels without fringes that give the user a very simple visual tool to guide him/her towards the optimal system alignment for best measurement. For instance, two threshold modulation values could be used to assign colors. Below the first value the pixels would be assigned one color, for example red, showing the part is out of focus/alignment, the signal is low, and a bad measurement would result. Between the first and second thresholds, one might employ yellow coloring to denote marginal measurement capability; and above the second threshold, green could be used to indicate that a good measurement is assured. More threshold levels could be used for even finer feedback. Alternatively, instead of coloring pixels, the brightness of pixels could be adjusted so that the image is most bright when focus is achieved. Similarly, an indicator such as a cross-hatch pattern could be overlaid on areas that have a particular level (good or bad) of modulation, such as for instance for a user who is color-blind, so that in-focus and out-of-focus situations could be readily distinguished.

Those skilled in the art understand that while the modulation of fringes is normalized by an average intensity the fringe amplitude is not so normalized. However, both modulation and amplitude can be used to determine where a good phase measurement can be achieved and in some cases one may be a better indicator than the other. For example, fringe amplitude will be a better indicator then modulation when the background intensity is low. Therefore, both modulation and amplitude may be used as indicators of best focus according to this aspect of the invention and the term "fringe properties" is used herein without limitation to encompass both.

Using such color scheme, as an example, an operator looking at the monitor's screen and finding it all red would know that the sample would need to be moved with respect to the instrument (or vice versa) to find focus. If the center of the image showed a line of green fading to yellow on either side of the line, that would typically indicate that there is tilt so that only one band of the part is in best focus. Additional indicators could be used to show which direction the user should tilt the instrument by noting the orientation of the lines separating green and yellow colors. Similarly, the instrument may even be configured to automatically capture all measurements where the coloring is green (and reject measurements where the coloring is red), regardless of what the operator is doing, to ensure that only meaningful surface data are acquired. Similar to the tilt indicator, if the operator is approaching a part and coloring is going from red towards yellow or yellow towards green (or yellow towards red, or green towards yellow), an arrow or other visible indicator can be superimposed on the image or next to it to show the user which direction he/she should move the measurement system to get to best focus.

Those skilled in the art will understand that the preceding exemplary embodiments of the invention provide the foundation for alternatives and modifications that are also deemed within the scope of the invention. For example, it is understood that the invention could be practiced by generating the fringes in conventional manner using a Wollaston prism pair combined with a laser diode. A laser diode would be used because the Wollaston prism pair requires substantially monochromatic light to produce the desired depth of focus in the product and current LEDs are not bright enough to provide sufficient light when filtered to the required level. However, this approach is not preferred because the cycloidal waveplate configurations are more compact, involve a single piece instead of two bonded optics, and are achromatic (thus, they do not require the use of filtered-LED or laser light).

Therefore, while the invention has been shown and described herein in what is believed to be the most practical and preferred embodiments, it is recognized that departures can be made therefrom and the invention is not to be limited to the disclosed details but is to be accorded the full scope of the claims to embrace any and all equivalent apparatus and methods.

The invention claimed is:

1. A fringe-projection interferometric apparatus comprising:
   a light source;
   an orthogonal polarizer producing two orthogonally polarized beams from an incident beam received from the light source;
   a focusing element for imaging a combined beam of said orthogonally polarized beams on a test surface, said combined beam being projected on the test surface in orthogonally polarized states such that virtual fringes are imaged on the test surface;
   a dynamic imaging system adapted to receive said combined beam after reflection from the test surface, said dynamic imaging system including a plurality of optical elements adapted to produce predetermined phase shifts between the orthogonally polarized beams, thereby producing a plurality of phase-shifted interferograms, said dynamic imaging system including a light detector in optical alignment with each of said phase-shifted interferograms; and
   a processor programmed to perform an interferometric measurement of the test surface based on said spatially phase-shifted interferograms.

2. The apparatus of claim 1, further comprising a phase-shifting mechanism in an illumination path of said incident beam received from the light source.

3. The apparatus of claim 1, wherein said orthogonal polarizer is a cycloidal diffraction waveplate.

4. The apparatus of claim 1, wherein said dynamic imaging system comprises a pixelated phase mask adapted to receive said combined beam after reflection from the test surface, said pixelated phase mask including a plurality of sets of phase-mask elements, each set being adapted to produce a predetermined phase shift between the orthogonally polarized beams, wherein said combined beam impinges in undivided form upon each of said sets of phase-mask elements along a single optical axis, thereby producing a plurality of spatially phase-shifted interferograms; and wherein said light detector is in optical alignment with the pixelated phase mask, each of said plurality of sets of phase-mask elements being aligned with a corresponding set of detector pixels.

5. The apparatus of claim 1, wherein said dynamic imaging system comprises a wave-front splitting element adapted to receive said combined beam after reflection from the test surface and to split the combined beam into separate sub-wavefronts; and a phase-shifting interference element that includes a plurality of distinct sections receiving respective separate sub-wavefronts, each of said distinct sections being adapted to produce a predetermined phase shift between the orthogonally polarized beams, thereby producing a corresponding plurality of spatially phase-shifted interferograms; and wherein said light detector is in optical alignment with said distinct sections of the phase-shifting interference element.

6. The apparatus of claim 2, wherein said processor is also programmed to actuate said phase-shifting mechanism so as to produce temporal phase shifts in said combined beam projected on the test surface and to perform an interferometric measurement based on interferograms produced by said temporal phase shifts.

7. The apparatus of claim 6, wherein said temporal phase shifts are three or more phase shifts.

8. The apparatus of claim 6, wherein said temporal phase shifts are two phase shifts separated by $(\pi+2n\pi)$ radians, where n is 0 or an integer number, and the processor is furthered programmed to calculate a gain map from the two interferograms produced by the temporal phase shifts and to apply said gain map to either of said two interferograms to remove noise from the corresponding spatially phase-shifted interferograms.

9. The apparatus of claim 4, wherein two or more of said sets of phase-mask elements of the pixelated phase mask are combined to create a set of super-pixels having elements with phase differences adding to a multiple of 180 degrees.

10. The apparatus of claim 9, wherein said super-pixels are assigned visible indicators based on corresponding fringe properties measured at a detector.

11. A fringe-projection interferometric method comprising the following steps:
   providing a light source;
   passing a beam from the light source through an orthogonal polarizer to produce two orthogonally polarized beams;
   focusing a combined beam of said orthogonally polarized beams on a test surface, said combined beam being projected on the test surface in orthogonally polarized states such that virtual fringes are imaged on the test surface;
   injecting said combined beam, after reflection from the test surface, into a dynamic imaging system including a plurality of optical elements adapted to produce predetermined phase shifts between the orthogonally polarized beams, thereby producing a plurality of phase-shifted interferograms, said dynamic imaging system including a light detector in optical alignment with each of said phase-shifted interferograms; and
   performing with a processor an interferometric measurement of the test surface based on said spatially phase-shifted interferograms.

12. The method of claim 11, further comprising the step of phase-shifting said beam from the light source so as to produce temporal phase shifts in said combined beam projected on the test surface, and said performing step is based on interferograms produced by said temporal phase shifts.

13. The method of claim 12, wherein said temporal phase shifts are three or more phase shifts.

14. The method of claim 12, wherein said temporal phase shifts are two phase shifts separated by (π+2n π) radians, where n is 0 or an integer number, and the processor is furthered programmed to calculate a gain map from the two interferograms produced by the temporal phase shifts and to apply said gain map to either of said two interferograms to remove noise from the corresponding spatially phase-shifted interferograms.

15. The method of claim 11, wherein said dynamic imaging system comprises a pixelated phase mask adapted to receive said combined beam after reflection from the test surface, said pixelated phase mask including a plurality of sets of phase-mask elements, each set being adapted to produce a predetermined phase shift between the orthogonally polarized beams, wherein said combined beam impinges in undivided form upon each of said sets of phase-mask elements along a single optical axis, thereby producing a plurality of spatially phase-shifted interferograms; and wherein said light detector is in optical alignment with the pixelated phase mask, each of said plurality of sets of phase-mask elements being aligned with a corresponding set of detector pixels.

16. The method of claim 15, wherein two or more of said sets of phase-mask elements of the pixelated phase mask are combined to create a set of super-pixels having elements with phase differences adding to a multiple of 180 degrees.

17. The method of claim 16, wherein said super-pixels are assigned visible indicators based on corresponding fringe properties measured at a detector.

18. The method of claim 11, wherein said dynamic imaging system comprises a wave-front splitting element adapted to receive said combined beam after reflection from the test surface and to split the combined beam into separate sub-wavefronts; and a phase-shifting interference element that includes a plurality of distinct sections receiving respective separate sub-wavefronts, each of said distinct sections being adapted to produce a predetermined phase shift between the orthogonally polarized beams, thereby producing a corresponding plurality of spatially phase-shifted interferograms; and wherein said light detector is in optical alignment with said distinct sections of the phase-shifting interference element.

19. A dynamic fringe-projection interferometer comprising:
   a light source;
   a cycloidal diffractive waveplate producing two orthogonally polarized beams from an incident beam received from the light source;
   a focusing element for imaging a combined beam of said orthogonally polarized beams on a test surface, said combined beam being projected on the test surface in orthogonally polarized states such that virtual fringes are imaged on the test surface;
   a pixelated phase mask adapted to receive said combined beam after reflection from the test surface, said pixelated phase mask including a plurality of sets of phase-mask elements, each set being adapted to produce a predetermined phase shift between the orthogonally polarized beams, wherein said combined beam impinges in undivided form upon each of said sets of phase-mask elements along a single optical axis, thereby producing a plurality of spatially phase-shifted interferograms;
   a light detector in optical alignment with the pixelated phase mask, each of said plurality of sets of phase-mask elements being aligned with a corresponding set of detector pixels;
   a phase-shifting mechanism in an illumination path of said incident beam received from the light source, and
   a processor programmed to perform an interferometric measurement of the test surface based on said spatially phase-shifted interferograms.

* * * * *

UNITED STATES PATENT AND TRADEMARK OFFICE
CERTIFICATE OF CORRECTION

PATENT NO. : 9,958,251 B1  
APPLICATION NO. : 15/227837  
DATED : May 1, 2018  
INVENTOR(S) : Neal Brock et al.

Page 1 of 1

It is certified that error appears in the above-identified patent and that said Letters Patent is hereby corrected as shown below:

On the Title Page

Item (73) "AD" should read -4D-

Signed and Sealed this
Twelfth Day of June, 2018

Andrei Iancu
*Director of the United States Patent and Trademark Office*